US005661214A

United States Patent [19]
Brunelle et al.

[11] Patent Number: 5,661,214
[45] Date of Patent: Aug. 26, 1997

[54] TITANATE ESTERS USEFUL AS POLYMERIZATION INITIATORS FOR MACROCYLIC POLYESTER OLIGOMERS

[75] Inventors: Daniel Joseph Brunelle, Burnt Hills; Judith Ann Serth-Guzzo, Slingerlands, both of N.Y.

[73] Assignee: General Electric Company, Schenectady, N.Y.

[21] Appl. No.: 695,155

[22] Filed: Aug. 5, 1996

[51] Int. Cl.[6] .............................. C08K 3/10; C08G 63/82
[52] U.S. Cl. ........................ 524/783; 528/279; 528/490; 528/491; 528/503
[58] Field of Search .................................. 528/279, 490, 528/491, 503; 524/783

[56] References Cited

U.S. PATENT DOCUMENTS

| | | | |
|---|---|---|---|
| 5,039,783 | 8/1991 | Brunelle et al. | 528/277 |
| 5,214,158 | 5/1993 | Brunelle et al. | 549/267 |
| 5,231,161 | 7/1993 | Brunelle et al. | 528/272 |
| 5,321,117 | 6/1994 | Brunelle | 528/272 |
| 5,466,744 | 11/1995 | Evans et al. | 524/714 |
| 5,527,976 | 6/1996 | Takekoshi et al. | 585/16 |

*Primary Examiner*—Samuel A. Acquah
*Attorney, Agent, or Firm*—William H. Pittman

[57] ABSTRACT

Macrocyclic polyester oligomer compositions are polymerized to high molecular weight polyesters by heating with a titanate ester composition comprising moieties having oxygen or nitrogen chelated with a titanium atom or having two titanium atom connected by alkylene ester units. Depending on the chemical nature of the initiator, the polymerization reaction may be extremely rapid as desired for structural reaction injection molding, or may have an induction period as desired for resin transfer molding.

19 Claims, No Drawings

TITANATE ESTERS USEFUL AS POLYMERIZATION INITIATORS FOR MACROCYLIC POLYESTER OLIGOMERS

BACKGROUND OF THE INVENTION

This invention relates to the polymerization of macrocyclic polyester oligomer compositions. More particularly, it relates to the use of certain titanate esters as initiators for such polymerization.

The preparation of macrocyclic poly(alkylene dicarboxylate) oligomers and their polymerization to linear polyesters is described in U.S. Pat. Nos. 5,039,783, 5,214, 158, 5,231,161, 5,321,117 and 5,466,744. The initiators employed for such polymerization include various organotin compounds and titanate esters.

Polymerization using these initiators is quite successful and affords polyesters having excellent properties and a wide variety of potential applications. However, to broaden the application areas in which the macrocyclic polyesters can be employed it is necessary to develop initiator systems of increased versatility.

For example, in structural reaction injection molding (hereinafter sometimes "RIM") processes a mold is initially charged with a fibrous reinforcement material and is subsequently filled by the introduction of two reactive streams. It is necessary for reaction to occur almost immediately and to be complete in less than 5 minutes, whereupon the molded part is removed and the charging operation repeated. For this purpose, therefore, extremely fast initiators are desired.

Conversely, in resin transfer molding (hereinafter "RTM") the two reactive streams are mixed outside the mold and the combination thereof is injected into the mold containing the fibrous reinforcement. It is necessary under those conditions to maintain the mixture in unpolymerized state until injection into the mold is complete, whereupon rapid reaction should occur. In other words, an induction period of measurable length, typically from about 15 seconds to about 2 minutes, is required. Merely decreasing the amount of initiator used is ineffective until very low levels are reached, whereupon polymerization is incomplete.

Another factor of concern is the level of initiator present in the polymerization mixture. Increasing the initiator level tends to increase the reaction rate and afford a more completely polymerized product. However, it also decreases the molecular weight of the polymer product when a tetraalkyl titanate, for example, is employed as an initiator, since each molecule of initiator initiates formation of an individual polymer molecule and generates four moles of alcohol which can function as a chain stopper.

Still further, the purity of the macrocyclic polyester oligomers can affect polymerization conditions and product quality. For the production of polyesters with the highest possible conversions and molecular weights, it is often necessary to remove linear carboxylic acid-terminated oligomers from the macrocyclics composition, as by passage through basic alumina in a column or the like. It would be desirable to eliminate this purification step without adversely affecting reaction rate or product molecular weight to any great extent.

SUMMARY OF THE INVENTION

The foregoing goals may be achieved by the present invention, which includes the use as polymerization initiators of a series of titanium ester compounds containing various functional groups. The proportions of these functional groups may be tailored to produce a very rapid polymerization reaction, a measurable induction period followed by rapid reaction, or any condition between these extremes. The initiators may also be tailored to afford rapid polymerization to high molecular weight products using unpurified macrocyclic oligomers or using high initiator levels.

In one of its aspects, the invention is a method for preparing a polyester which comprises contacting at least one macrocyclic polyester oligomer with at least one macrocyclic polyester oligomer polymerization initiator comprising titanate ester compounds having at least one moiety of the formula

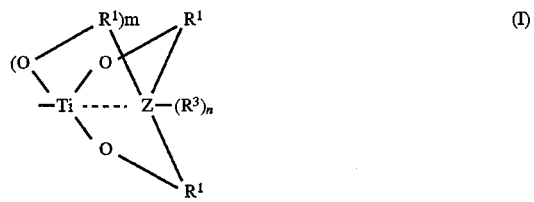

or

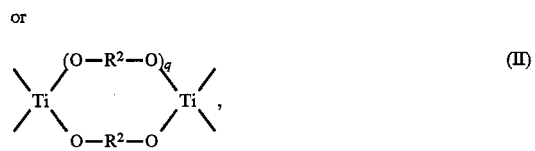

wherein:

each $R^1$ is independently $C_{2-3}$ alkylene;

each $R^2$ is independently $C_{2-6}$ alkylene;

Z is O or N;

$R^3$ is $C_{1-6}$ alkyl or unsubstituted or substituted phenyl;

when Z is O, m=n=0, and when Z is N, m=0 or 1 and m+n=1; and q is 0 or 1.

Another aspect is branched polyesters comprising at least one branching structural unit of the formula $$(R^3)_n Z(R^1 O-)_{m+2},\qquad\text{(III)}$$

wherein $R^1$, $R^3$, Z, m and n are as previously defined.

DETAILED DESCRIPTION; PREFERRED EMBODIMENTS

The macrocyclic polyester oligomers which are polymerized according to this invention may be prepared by contacting at least one diol of the formula HO—$R_4$—OH and at least one diacid chloride of the formula

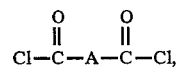

wherein $R_4$ is an alkylene or mono- or polyoxyalkylene radical containing a straight chain of about 2–8 atoms and A is a m- or p-linked monocyclic aromatic or alicyclic radical, under substantially anhydrous conditions and in the presence of a substantially water-immiscible organic solvent, with at least one unhindered tertiary amine; said contact being conducted at a temperature from about −25° to about +25° C. This procedure is described in detail in the aforementioned patents, and it is therefore deemed unnecessary to provide a detailed explanation herein. In most instances, the products are mixtures of macrocyclic oligomers having differing degrees of polymerization. The preferred oligomers in many instances are poly(1,4-butylene terephthalate) ("PBT"), poly(ethylene terephthalate) ("PET") and copolymers thereof.

According to the present invention, the macrocyclic polyester oligomers are converted to linear or branched high molecular weight polyesters by contact with a titanium-containing macrocyclic polyester oligomer polymerization initiator. Suitable initiators include certain commercially available compounds such as isopropyl triethanolaminatotitanate, in which an isopropoxy group is bound to the moiety of formula III, $R^1$ is ethylene, Z is N, m is 1 and n is 0. This compound is sold by E.I. DuPont de Nemours and Company under the tradename "Tyzor TE". It is normally sold as a solution in isopropyl alcohol. To maximize polyester molecular weight, it is usually preferred to replace the alcohol with an inert solvent such as xylene; this may easily be achieved by introducing the inert solvent and removing the alcohol by distillation.

Also included as suitable initiators are numerous titanate ester compounds having moieties of formulas I and II. In those formulas, $R_1$ can be ethylene, methylethylene or trimethylene and $R^2$ can be any $C_{2-6}$ alkylene group. $R^3$ may be alkyl or phenyl, and if it is phenyl it may be substituted with various electron-donating or electron-withdrawing substituents which can be chosen to "fine tune" the activity of the initiator.

The preferred alkylene groups are those corresponding to the alkylene groups in the polyester, which is most often ethylene, tetramethylene or both. In the same vein, it is often preferred to convert such compounds as isopropyl triethanolaminatotitanate to the corresponding ethylene or butylene diesters by transesterification with ethylene glycol or 1,4-butanediol.

In the moieties of formula II, two titanium atoms are joined by one or two —O—$R_2$—O—moieties, forming a cyclic structure when q is 1. The free valence bonds in formulas I and II are most often bound to $C_{1-10}$ and especially $C_{6-10}$ alkoxy groups, including n-propyl, isopropyl, n-hexyl, n-octyl, n-decyl and 2-ethylhexyl.

Many of the titanate ester compositions useful as initiators are described in copending, commonly owned application Ser. No. 08/618,738. Such compositions may be prepared by the reaction of at least one tetraalkyl titanate with polyhydroxy reagents such as 1,4-butanediol, diethylene glycol, methyldiethanolamine and phenyldiethanolamine. The reaction may be conducted at temperatures in the range of about 80°–150° C., typically in the presence of a solvent such as xylene or o-dichlorobenzene. It is usually convenient to heat the reaction mixture to a temperature at which by-product alcohol displaced from the tetraalkyl titanate is removed by distillation. An inert atmosphere such as nitrogen or argon is generally preferred.

When the reaction is complete, solvent may be removed to afford the neat titanate ester. It is often preferred, however, to adjust the solvent proportion to afford a solution of known strength, which may then be easily blended with the macrocyclic oligomers to produce a known initiator concentration.

Reactant ratios may be adjusted to provide the desired proportions of moieties of formulas I and II. Thus, for example, the reaction of equimolar proportions of tetraisopropyl titanate, diethylene glycol and 1,4-butanediol affords a compound of the formula

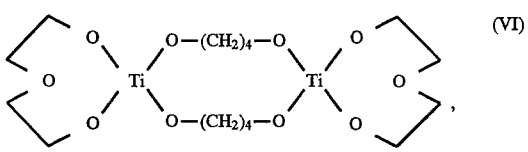

while the reaction of one mole of tetraisopropyl titanate with two moles of methyldiethanolamine affords a compound of the formula

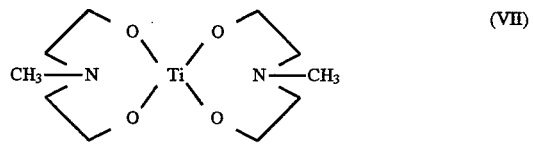

Compositions comprising compounds having alkoxy groups bound to titanium may be prepared by employing less than a stoichiometric amount of dihydroxy compound. The invention includes the use as initiators of mixtures of compounds having moieties of formulas I and II, as well as the substantially pure compounds.

The preparation of titanate esters useful as initiators according to the present invention is illustrated by the following examples.

EXAMPLE 1

A mixture of 7.10 g (25 mmol) of isopropyl titanate, 5.958 g (50 mmol) of methyldiethanolamine and 50 ml of dry o-xylene was prepared under nitrogen and heated to 100° C., whereupon isopropanol began to distill. Distillation was continued as the pot temperature was raised slowly to about 160° C., at which point xylene began to distill. The xylene concentration was adjusted to produce a 1.0M solution of the titanium ester having formula VII.

EXAMPLE 2

A mixture of 12.66 g (50 mmol) of isopropyl triethanolaminatotitanate, 2.25 g (25 mmol) of 1,4-butanediol and 100 ml of dry o-xylene was prepared in a nitrogen atmosphere and heated as in Example 1. Finally, the xylene was added to make an 0.5M solution of the desired 1,4-butylene bis(triethanolaminato-titanate).

EXAMPLE 3

A mixture of 28.40 g (100 mmol) of isopropyl titanate, 10.61 g (100 mmol) of diethylene glycol and 9.01 g (100 mmol) of 1,4-butanediol was prepared in a nitrogen atmosphere and heated to 100° C., whereupon isopropanol began to distill. The pot temperature was raised slowly to about 150° C. and a 1/1 (by volume) mixture of xylene and o-dichlorobenzene was added. Distillation was continued until the temperature of the distillate reached 140° C., indicating that all isopropanol had been removed. Additional xylene/o-dichlorobenzene mixture was then added to produce a 1.0M solution of the desired titanate ester of formula VI.

EXAMPLES 4–19

Following the procedure of Example 1, various mixed titanate esters were prepared by the reaction of tetra-2-ethylhexyl titanate with various diols. The products, listed in Table I, contained the following alcohol-derived groups in the proportions listed:

2EH—2-ethylhexanol

MDEA—methyldiethanolamine
BDEA—n-butyldiethanolamine
PDEA—phenyldiethanolamine
BD—1,4-butanediol
DEG—diethylene glycol.

TABLE I

| Example | Alcohols | |
|---|---|---|
| | Identity | Proportion |
| 4 | 2EH | 2.0 |
| | MDEA | 1.0 |
| 5 | 2EH | 2.0 |
| | BDEA | 1.0 |
| 6 | 2EH | 0.8 |
| | MDEA | 1.6 |
| 7 | 2EH | 2.0 |
| | PDEA | 1.0 |
| 8 | 2EH | 2.0 |
| | BD | 1.0 |
| 9 | 2EH | 1.0 |
| | MDEA | 1.0 |
| | BD | 0.5 |
| 10 | 2EH | 0.6 |
| | MDEA | 1.0 |
| | BD | 0.7 |
| 11 | 2EH | 2.0 |
| | DEG | 1.0 |
| 12 | 2EH | 3.0 |
| | MDEA | 0.5 |
| 13 | 2EH | 1.4 |
| | MDEA | 1.3 |
| 14 | 2EH | 2.6 |
| | MDEA | 0.7 |
| 15 | 2EH | 2.6 |
| | PDEA | 0.7 |
| 16 | 2EH | 1.4 |
| | BD | 1.3 |
| 17 | 2EH | 1.2 |
| | MDEA | 0.7 |
| | BD | 0.7 |
| 18 | BD | 1.0 |
| | DEG | 1.0 |
| 19 | BD | 1.0 |
| | MDEA | 1.0 |

According to the present invention, the macrocyclic polyester oligomers are converted to high molecular weight polyesters by contact at a temperature in the range of about 160°–300° C., preferably 160°–250° C., with the titanate ester employed as a macrocyclic polyester oligomer polymerization initiator. The latter is typically present in the amount of about 0.01–2.0 and preferably about 0.05–1.0 mole percent based on structural units in the oligomers. In the case of initiators containing more than one titanium atom, the mole percentage calculation is on the basis of a single titanium atom per molecule.

As disclosed in the aforementioned copending application Ser. No. 08/618,738 and in copending, commonly owned application Ser. No. 08/61 8,742, titanium catalysts such as the ones described herein may also be employed for the depolymerization of linear or branched polyesters to macrocyclic polyester oligomers. Polymerization and depolymerization are in equilibrium which may be effectively shifted by controlling concentration. Thus, polymerization predominates when neat macrocyclic oligomers are contacted with the catalyst, and depolymerization when a relatively dilute solution of linear or branched polymer in an organic solvent is contacted with the same catalyst.

For such operations as RTM where an induction period is necessary to permit the polymerization charge to fill the mold, it is preferred to employ compounds comprising moieties of formula I in which Z is N and $R^3$ is alkyl. On the other hand, in SRIM and other methods which require the polymerization reaction to be initiated instantly and to be complete in a very short time, the employment of compounds of formula II or those of formula I in which Z is O, or Z is N and $R^3$ is phenyl, is preferred.

The polyesters prepared by the method of this invention may have high molecular weights even when prepared from oligomer mixtures with a relatively high proportion of acidic impurities. The titanate esters initiate polymerization by incorporating ester units between the oxygen and carbon atoms in their molecular structure. Thus, as a rule the titanium remains in the polyester end group but is removed upon contact with moist air. The branched polyesters of this invention having branching units of formula III are prepared using the titanate esters of formula I as catalysts.

It is within the scope of the invention to employ a mixture of catalysts to produce a mixture of branched and linear polyesters. The proportions of the two types of catalysts may be varied to afford the desired degree of branching.

The method of this invention is illustrated by the following examples.

EXAMPLE 20

The macrocyclic polyester oligomer composition employed was a mixture of oligomers having various degrees of polymerization with 95 mole percent PBT and 5 mole percent PET units. A 25-ml round-bottomed flask was charged with 5 g (22.94 mmol based on structural units) of the macrocyclic oligomer composition and equipped with a magnetic stirrer and a nitrogen/vacuum adaptor. The oligomers were dried by heating at 100° C./1 torr for 10 minutes and were then melted by heating at 180°–190° C./1 torr for 10 minutes. The vacuum was released with nitrogen and various quantities of polymerization catalyst were added, as a solution in o-xylene unless otherwise specified. A reaction timer was started at the time of catalyst addition. The time for the melt to stop the magnetic stirrer was noted as an indication of induction period, with times ranging from about 5 seconds to about 2.5 minutes being considered acceptable.

After the stirrer stopped, heating under nitrogen was continued for up to 45 minutes during which time crystallization of the polymerized product to a white solid usually began. At the end of the polymerization time, the flask was cooled to room temperature and broken to remove the polyester product, which was analyzed by gel permeation chromatography to determined percent polymerization and molecular weight relative to polystyrene. The results are shown in Table II, in comparison with a control in which the catalyst employed was tetra-(2-ethylhexyl) titanate.

TABLE II

| Initiator | | | Induction | Polymerization | Polyester | |
|---|---|---|---|---|---|---|
| Identity | Mole % | Temperature, °C. | period, sec.*** | time, min. | Yield, % | Mw |
| Control | 0.3 | 190 | 6 | 45 | 94 | 80,000 |
| "Tyzor TE"** | 0.5 | 190 | 90 | 45 | 98 | 123,000 |
| "Tyzor TE" | 0.3 | 190 | 180 | 45 | 66 | 266,000 |
| " | 0.4 | 190 | 120 | 45 | 94 | 364,000 |
| " | 0.4 | 185 | 120 | 45 | 80 | 236,000 |
| Ex. 1 | 0.15 | 200 | 120 | 45 | 78 | 247,000 |
| " | 0.3 | 190 | 55 | 45 | 94 | 218,000 |
| " | 0.4 | 180 | 135 | 45 | 93 | 161,000 |
| Ex. 2 | 0.3 | 190 | 180 | 45 | 92 | 265,000 |
| Ex. 4* | 0.5 | 195 | — | 7 | 98 | 84,000 |
| Ex. 4 | 0.5 | 195 | — | 5 | 99 | 84,000 |
| Ex. 5* | 0.4 | 190 | 15 | 10 | 98 | 119,000 |
| Ex. 5 | 0.5 | 195 | 10 | 5 | 99 | 93,000 |
| Ex. 10 | 0.5 | 190 | 9 | 5 | 99 | 101,000 |
| Ex. 12* | 0.35 | 195 | 5 | 7 | 96 | 103,000 |
| Ex. 12 | 0.35 | 195 | — | 5 | 99 | 104,000 |
| Ex. 13 | 0.35 | 195 | 5 | 5 | 99 | 86,000 |
| Ex. 19 | 0.3 | 190 | 11 | 10 | 96 | 138,000 |
| " | 0.3 | 190 | 16 | 5 | 94 | 285,000 |

*Crude macrocyclics containing linear oligomers.
**85% solution in isopropyl alcohol.
***Time required to stop magnetic stirrer.

A comparison of the Example 4, Example 5 and Example 12 runs using crude and pure macrocyclic oligomer compositions demonstrates that the crude compositions may require more time to achieve a yield or molecular weight comparable to that provided by pure oligomer compositions. In all instances, the initiators used according to the invention afforded polymers of higher molecular weight than the control. Induction periods, when measured, were all of reasonable lengths and varied enough that one skilled in the art could tailor an initiator composition to provide the required induction period.

EXAMPLE 21

The procedure of Example 20 was repeated, employing several other catalysts which are characterized by little or no induction period (i.e., 5 seconds or less required to stop the magnetic stirrer). The results are given in Table III, again in comparison with controls employing tetra-(2-ethylhexyl) titanate.

TABLE III

| Initiator | | Polymerization | Polyester | |
|---|---|---|---|---|
| Identity | Mole % | time, min. | Yield, % | Mw |
| Control 1* | 0.3 | 20–45 | 95 | 104,000 |
| Control 2 | 0.3 | 20–45 | 98 | 108,000 |
| Control 3** | 0.3 | 5 | 94 | 88,000 |
| Control 4 | 0.3 | 5 | 90 | 97,000 |
| Ex. 3* | 0.3 | 20–45 | 95 | 210,000 |
| Ex. 3 | 0.3 | 20–45 | 98 | 234,000 |
| Ex. 7** | 0.45 | 5 | 97 | 113,000 |
| Ex. 7 | 0.5 | 5 | 97 | 109,000 |
| Ex. 8** | 0.5 | 5 | 99 | 100,000 |
| Ex. 8** | 0.3 | 5 | 97 | 102,000 |
| Ex. 8 | 0.43 | 2.5 | 99 | 100,000 |
| Ex. 11** | 0.42 | 5 | 94 | 139,000 |
| Ex. 16** | 0.5 | 5 | 95 | 126,000 |

*PBT; all others contained 5 mole percent PET units.
**Crude macrocyclics containing linear oligomers.

A comparison of Controls 1 and 2 with the Example 3 runs shows that the initiators of the present invention afforded polymers of substantially higher molecular weight. The same is shown by a comparison of Controls 3 and 4 with the Example 7 runs, even employing higher initiator levels according to the invention than in the controls. It is also apparent from the runs according to the invention that very high molecular weight polymers can be obtained even with the use of crude macrocyclic compositions.

What is claimed is:

1. A method for preparing a polyester which comprises contacting at least one macrocyclic polyester oligomer with at least one macrocyclic polyester oligomer polymerization initiator comprising titanate ester compounds having at least one moiety of the formula

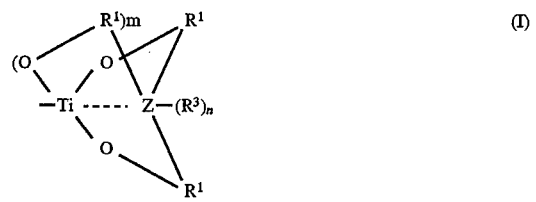

(I)

or

(II)

wherein:
each $R^1$ is independently $C_{2-3}$ alkylene;
each $R^2$ is independently $C_{2-6}$ alkylene; Z is O or N;
$R^3$ is $C_{1-6}$ alkyl or unsubstituted or substituted phenyl;
when $Z^2$ is O, m=n=0, and when $Z^2$ is N, m=0 or 1 and m+n=1; and q is 0 or 1.

2. A method according to claim 1 wherein the macrocyclic polyester oligomer comprises 1,4-butylene terephthalate units.

3. A method according to claim 1 wherein the macrocyclic polyester oligomer comprises ethylene terephthalate units.

4. A method according to claim 1 wherein the initiator comprises compounds having at least one moiety of formula I.

5. A method according to claim 4 wherein Z is O.

6. A method according to claim 4 wherein Z is N.

7. A method according to claim 6 wherein n is 1.

8. A method according to claim 6 wherein m is 1.

9. A method according to claim 6 wherein $R^1$ is ethylene.

10. A method according to claim 6 wherein $R^3$ is methyl or phenyl.

11. A method according to claim 1 wherein the initiator comprises compounds having at least one moiety of formula II.

12. A method according to claim 11 wherein each $R^2$ is 1,4-butylene.

13. A method according to claim 11 wherein q is 0.

14. A method according to claim 11 wherein q is 1.

15. A method according to claim 1 wherein the initiator is present in the amount of about 0.01–2.0 mole percent based on structural units in the oligomers.

16. A branched polyester comprising at least one branching structural unit of the formula $$R^3\text{—}N(R^{10}\text{—})3, \quad \text{(III)}$$

wherein:

each $R^1$ is independently $C_{2-3}$ alkylene;

$R^3$ is $C_{1-6}$ alkyl or unsubstituted or substituted phenyl;

m=0 or 1; and m+n=1.

17. A polyester according to claim 16 which comprises at least one of 1,4-butylene terephthalate and ethylene terephthalate units.

18. A polyester according to claim 17 wherein $R^1$ is ethylene.

19. A polyester according to claim 17 wherein $R^3$ is methyl or phenyl.

* * * * *